United States Patent

Shaffer

[15] 3,665,109

[45] May 23, 1972

[54] PULSING CIRCUIT INCLUDING A SERIES SWITCHING CIRCUIT

[72] Inventor: William E. Shaffer, Rochester, N.Y.

[73] Assignee: Stromberg-Carlson Corporation, Rochester, N.Y.

[22] Filed: Sept. 23, 1969

[21] Appl. No.: 860,375

[52] U.S. Cl. ........................................ 179/16 E, 179/16 AA

[51] Int. Cl. ........................................ H04g 1/36

[58] Field of Search ............... 179/10 E, 18 G, 18 EB, 18 HB, 179/18 F, 18 FA, 16 A, 16 AA; 320/1

[56] References Cited

UNITED STATES PATENTS 3,522,384 7/1970 Ricketts et al. ........................ 179/16 F 3,466,402 9/1969 Risky ................................ 179/18 FA 3,551,754 12/1970 Shaffer ............................. 179/18 FA

*Primary Examiner*—William C. Cooper

*Assistant Examiner*—Randall P. Myers

*Attorney*—Charles C. Krawczyk

[57] ABSTRACT

A switching circuit is connected in series with a control device, such as a relay or a saturable reactor, and a direct current power source, across a pair of conductors adapted to be connected to a telephone line so that the circuit functions as a pulsing circuit. A control circuit monitors the current flow in the series circuit to render the switching circuit momentarily non-conductive to briefly disconnect the power source when the telephone line is open circuited.

18 Claims, 2 Drawing Figures

Patented May 23, 1972 3,665,109

2 Sheets-Sheet 1

WILLIAM E. SHAFFER
INVENTOR.

BY Charles C. Krawczyk

ATTORNEYS

Patented May 23, 1972 3,665,109

2 Sheets-Sheet 2

WILLIAM E. SHAFFER
INVENTOR.

BY Charles C Krawczyk

ATTORNEYS

PULSING CIRCUIT INCLUDING A SERIES SWITCHING CIRCUIT

BACKGROUND OF THE INVENTION

This invention relates to switching circuits in general, and more particularly to circuits responsive to telephone supervisory and control signals, such as dial pulses.

This application is an improvement over a copending application Ser. No. 860,209 now abandoned filed for Charles A. Frumusa and William E. Shaffer and entitled "Pulsing Circuit" filed on the same day as the present application and is assigned to the assignee of the present application.

In recent years there has been an increased emphasis on the use of more sensitive and faster responding control devices in telephone systems to provide improved service. For example, saturable reactors and lower inertia and faster responding pulsing relays are presently being applied to circuits for control by telephone supervisory and control signals. However, such sensitive control devices, under various conditions, tend to produce distorted output pulses that at times exceed acceptable limits, and in the case of relays, tend to produce undesirable spurious or additional contact closures.

Telephone systems generally employ pulsing circuits that can be connected to any one of a large number of subscriber telephone lines. Each telephone line generally presents a different electrical characteristic depending upon its length, gauge, leakage, connected telephone set, etc. Each telephone line, therefore, presents a different value of capacitance, inductance and resistance between the subscriber's dial and the associated pulsing circuit so that the operating conditions of the pulsing circuit change with each telephone line connection. Furthermore, due to the high cost of copper, there is a general tendency to use smaller diameter conductors to reduce costs. However, the telephone lines including the smaller conductors exhibit a higher resistance per unit length, and may at times exhibit higher capacitance per unit length. Therefore, the length of such telephone lines becomes an increasing important factor in determining the electrical characteristics of the telephone loop.

The change in operating conditions between different line connections is particularly noticeable in central offices wherein higher supply voltages are used to assure that the required amount of line current flows through high resistance long line connections. The higher potentials and the various reactive components in the telephone loop tend to interact to apply distorted current pulses through the control device resulting in improper circuit operation, and in the case of pulsing relays, enhance the conditions under which undesirable spurious contact closures are generated.

Normally in the standard step-by-step switching system such distorted current pulses (within limits) and such spurious contact closures (within limits) generally do not create a problem, since the inertia of the step-by-step switching devices is sufficiently high that the distorted pulses and spurious contact closures do not seriously affect the operation of the system. However, in electronic switching systems and step-by step systems modified to include electronic switching circuits, the response time may be such that the circuit will incorrectly respond to the distorted current pulses and/or spurious contact closures and result in erroneous switching.

In addition to the foregoing, the components in usual telephone ringer circuits are designed for proper operation when connected to a central office battery having a standard range of output potentials. With the standard range of potentials, the current flow through a telephone ringer circuit due to the charge and discharge of capacitive elements in the telephone circuit during dialing is generally insufficient to overcome the inertia and spring bias of the ringer to cause the ringer to audibly tap. The amount of transient current flow through the ringer during dialing is proportional to the magnitude of the central office power supply voltage. Therefore, in central offices wherein the voltage of the central office batteries has been substantially increased over that of the usual range of battery voltages (to assure the required amount of line current in high resistance line connections) the conditions under which the ringer taps when the subscriber dials are enhanced and often reaches a value sufficient to overcome the inertia and spring bias of the ringer to cause the ringer to audibly tap. This type of ringer tap is generally annoying to the subscriber.

The circuit of the invention overcomes the disadvantages of the prior art by reducing the effects of the reactive components in telephone lines and sets on the switching response of pulsing circuits, and also significantly reduces the occurrence of ringer tap.

It is therefore an object of this invention to provide a new and improved pulsing circuit that reduces the likelihood of ringer tap in a connected subscriber telephone during dialing.

It is also another object of this invention to reduce the effect of the capacitive and inductive components on the switching response of a pulsing circuit.

It is another object of this invention to provide a new and improved pulsing circuit that can be used with short and long telephone lines and provide accurate pulsing.

It is also an object of this invention to provide a new and improved circuit which reduces ringer tap and pulse distortion.

BRIEF DESCRIPTION OF THE INVENTION

A switching circuit and a control device (such as a saturable reactor or a relay coil) are connected in a direct current series circuit between a power source and a pair of conductors so that the control device is activated when a direct current circuit is connected across the pair of conductors. A control circuit detects when the direct current circuit is opened and actuates the switching circuit to momentarily disconnect the power source from the series circuit.

In the case wherein the pair of conductors are to be connected to a telephone line, the power source remains disconnected for a controlled period of time in the order of the duration of the open circuit portion of telephone dial pulses.

A further feature of the invention includes a storage circuit coupled to the series circuit to function as a power source when the switching circuit is activated to disconnect the power source, to provide a signal to the control circuit so that the control circuit actuates the switching circuit to reconnect the power source to the series circuit in the event a direct current circuit is connected across the pair of conductors before the controlled period of time expires.

DESCRIPTION OF THE PREFERRED EMBODIMENT

Figure 1:
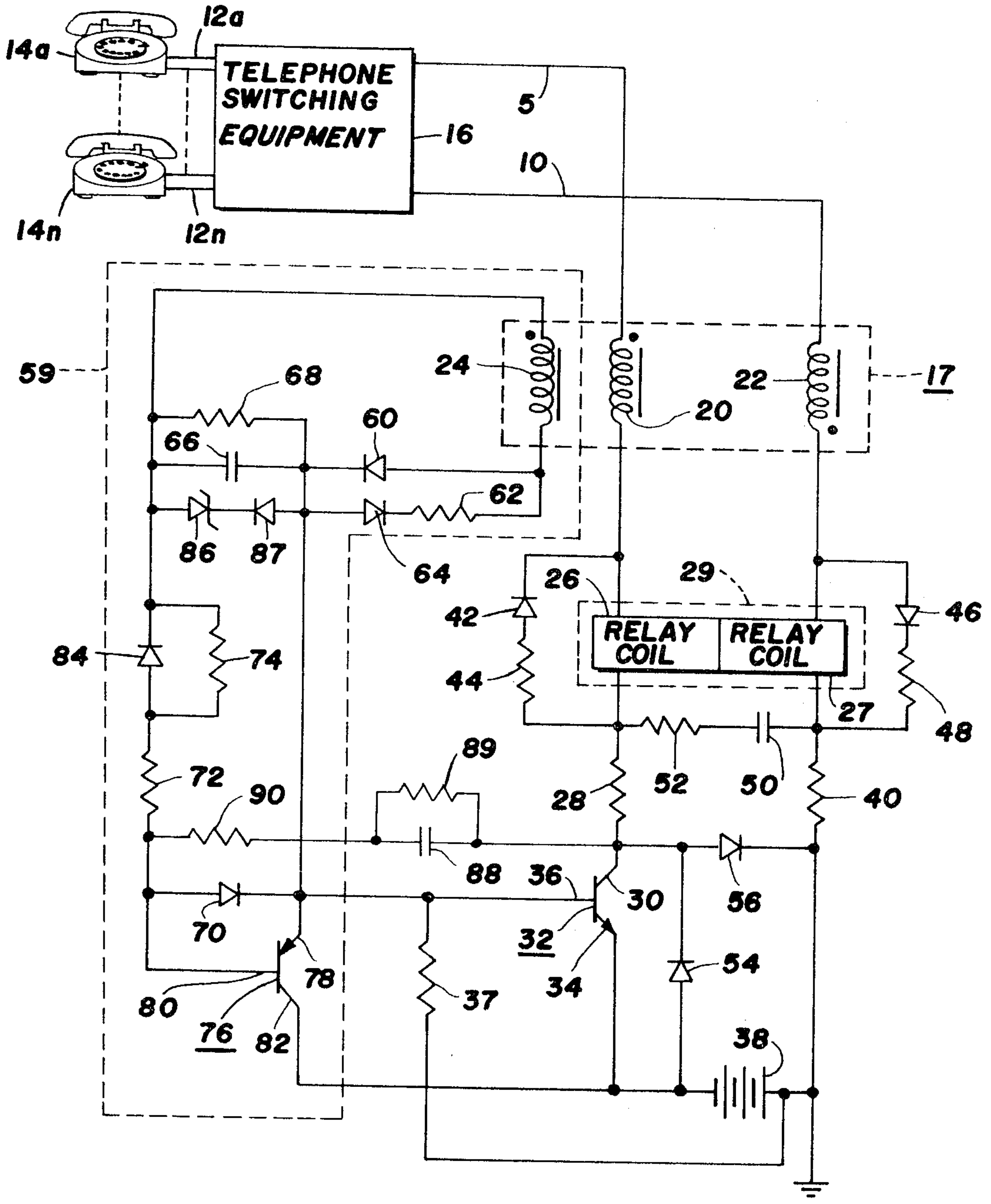
FIG. 1 is a schematic diagram of a first embodiment of a pulsing circuit of the invention including a relay control device.

The relay pulsing circuit of FIG. 1 is connected to a pair of central office conductors 5 and 10 generally designated as the tip and ring conductors, or a transmit pair. The relay circuit may, for example, be a portion of a selector circuit or a connector circuit in a step-by-step system, or a portion of a register circuit or junctor circuit in a common control system. The central office conductors 5 and 10 are adapted to be connected to any one of a large number of subscriber telephone lines **12*a* -12*n* and to their connected telephone sets 14*a* -14*n* through switching equipment 16** that can be any of the above mentioned telephone switching circuits.

The telephone lines **12*a* -12*n* of FIG. 1 can be terminated by the telephone sets 14*a* -14*n*** of the type fully described in an article entitled "An Improved Circuit for the Telephone Set" by A.F. Bennett in the "The Bell System Technical Journal," May 1953, Pages 611–625. The telephone set includes an alternating current ringer circuit for connection across a telephone line. The ringer circuit generally includes a ringer coil in series with a capacitor. The telephone dial includes contacts that alternately apply and remove a direct current circuit across the telephone line and ringer circuit at a predetermined rate to produce dial pulses having a preset time duration (within specified standard limits). In effect, during dialing alternate open and closed circuit conditions are exhibited across the connected telephone line and the conductors 5 and 10.

These alternate open and closed circuit conditions tend to cause the capacitive elements in the telephone circuit to be charged and discharged at the dial pulse rate through various paths including the ringer circuit. The current flow through the ringer circuit due to the charging and discharging of the capacitive elements may at times be enough to overcome the inertia and spring bias of the ringer to a sufficient degree to audibly tap the ringer. Generally, the transient surge of current through the ringer due to the discharge of the capacitive elements was found to have a higher instantaneous amplitude and therefore most troublesome. The ringer tap due to the discharge current was eliminated in the prior art by spring biasing the clapper of the ringer against the bell and by connecting the ringer in a manner so that the discharge current would be in a direction to keep the clapper against the bell.

However, when the battery voltage in the central offices is increased to assure sufficient telephone transmitter current in high resistance line connections, the ringer tap due to the charge current became more predominant than with the lower battery voltages. The use of a higher potential in the central office batteries results in a higher surge of charging current and thereby increases the tendency for producing ringer tap.

Furthermore, the reactive components in the telephone set and the telephone line and pulsing circuit tend to react in a manner to distort the current pulses applied to the pulsing control device from that of the operation of the dial contacts. Hence, the response of the control device to the distorted current pulses may result in generating output pulses that do not conform to the dial pulses, such as for example, by extending or shortening the time duration of the pulses. Furthermore, any oscillatory condition in the current pulse through the control device may result in a greater number of pulses, or spurious or added contact closures in the case of relays.

The circuit of FIG. 1 reduces the effect of the reactive components in the operation of a pulsing relay 29 and also significantly reduces the occurrence of ringer tap in a connected telephone. A transformer 17 has two primary windings 20 and 22 and secondary winding 24. The dots on the transformer windings 20 and 22 conventionally indicate the phase relationship between the windings. One lead of the primary winding 20 is connected to the conductor 5 while the other lead is connected through a relay coil 26 and current limiting resistor 28 to the collector 30 of a transistor 32. The emitter 34 of the transistor 32 is connected to the negative terminal of a central office power source 38. A biasing resistor 37 is connected between the base 36 of the transistor 32 and the positive terminal of the power source 38 (and ground) to provide a forward biasing potential for base-to-emitter junction of the transistor 32. One lead of the primary winding 22 is connected to the conductor 10, while the other lead is connected through a relay coil 27, and a current limiting resistor 40 to the positive terminal of the power source 38. The relay coils 26 and 27 are flux-aiding coils of the pulsing relay 29.

The relay coils 26 and 27 are shunted by the respective diodes 42 and 46 in series with current limiting resistors 44 and 48 respectively. A series circuit including a resistor 52 and a capacitor 50 is connected between one end of each of the relay coils 26 and 27. A pair of diodes 54 and 56 are connected between the junction of the resistor 28 and the collector 30 and opposite sides of the power source 38 to provide a protection circuit against transient signals due to lightning, etc.

Since the base of transistor 32 is forward biased by the resistor 37, when a closed circuit condition is exhibited across the lines 5 and 10 (such as an "off hook" condition or during dialing in a connected telephone) the telephone loop including the relay coils 26 and 27, the resistors 28 and 40, the windings 20 and 22, the transistor 32, and the connected telephone (14*a* –14*n*) is energized by the power source 38. The resistors 28 and 40 function to limit the amount of current flow in the direct current circuit so that the circuit can be connected to short and long telephone lines. Although the circuit of FIG. 1 includes two relay coils 26 and 27 and two primary windings 20 and 22 in a balanced configuration, it is to be understood that a single relay coil and a single primary winding could also be used in an unbalanced configuration.

A control circuit (within the dashed lines 59) is coupled between the series circuit and the transistor 32 to render the transistor 32 non-conductive for a controlled period of time after the telephone loop is open circuited. The control circuit includes a bi-directional rectifying circuit including a diode 60 connected in parallel with a series circuit including a resistor 62 and a diode 64. The bi-directional rectifying circuit is connected in series with the capacitor 66 across the secondary winding 24. The capacitor 66 is connected between the emitter 78 and the base 80 of a control transistor 76 through a series circuit including a resistor 72 and the parallel combination of a diode 84 and resistor 74. A limiting circuit including a zener diode 86 in series with a diode 87 is connected across the capacitor 66 to limit the amplitude of the voltage that can be developed across the capacitor. A diode 70 is connected between the base electrode 80 and the emitter electrode 78 to limit the magnitude of a reverse bias that can be applied thereto. The collector 82 of transistor 76 is connected to the negative terminal of source 38 while the emitter 78 is connected to the base 36 of transistor 32. When transistor 76 is rendered conductive, its current flows through the resistor 37, removes the forward bias on the transistor 32 and thereby render the transistor 32 non-conductive. A parallel circuit including a capacitor 88 and a resistor 89 is connected in series with a resistor 90 between the base 80 and the collector 30. In operation, when a connected telephone line exhibits a closed circuit across the conductors 5 and 10, such as "off hook" condition in a telephone set or during the closed circuit portion of dial pulses, a current supplied by the source 38 energizes the relay coils 26 and 27 and actuates the relay 29. The initial current surge through the primary windings 20 and 22 of transformer 17 induces a signal across the secondary winding 24 which has a polarity to forward bias the diode 64 and charge the capacitor 66 in a direction to back bias the transistor 76 thus insuring that the transistor 32 is forward biased.

When the connected telephone loop is open circuited (the load across the conductors 5 and 10 changes from a closed circuit condition to an open circuit condition) the polarity of the signal developed by the winding 24 reverses and the diode 60 becomes forward biased to charge the capacitor 66 in a direction to forward bias the transistor 76. The transistor 76 conducts through the resistor 37 to cut off the transistor 32. The time constant of the discharge circuit for the capacitor 66 is sufficiently long to assure that the transistor 32 stays non-conductive for a period in the order of the time duration of the open circuit portion of the dial pulses. Since the power supply 38 is disconnected from the series circuit when the transistor 32 is non-conductive, the capacitive elements in the vicinity of the telephone ringer are not charged during the open circuit portion of the dial pulses and thereby the charge that is stored during this period is minimized. Hence, the current flow through the capacitive elements during dialing is minimized and the conditions for creating ringer tap have been essentially eliminated.

It should be noted, that the capacitor 50 is charged while the transistor 32 is conducting and the charge is stored while the transistor 32 is rendered non-conductive. Hence, when the connected telephone loop subsequently is closed, the capacitor 50 acts as a temporary source (since source 38 may still be open circuited by transistor 32) and discharges through the series circuit to develop a signal across secondary winding 24 having a polarity to charge the capacitor 66 in a direction to render the transistor 76 non-conductive thereby forward biasing the transistor 32. This surge of current from the capacitor 50 assures that the transistor 76 is cut off and the transistor 32 is forward biased in response to a change from an open to a closed circuit condition across the conductors 5 and 10. In addition, the current flow through the resistor 90 and capacitor 88 when the telephone loop is switched from an open to a closed circuit (due to a charge on the capacitor 88) is in a direction to cut off the transistor 76.

The transistor 32 and its control circuit function as a switching circuit to detect when the series circuit is open circuited and remove the power source from the series circuit for a period of time in the order of the duration of the open circuit portion of the dial pulses and thereby provides a means for reducing the magnitude of a charge that can be stored in the capacitive components of the telephone loop during this period. The value of the resistors 68, 74 and 72 and the capacitor 66, and the characteristic of the zener diode 86 are selected so that the capacitor 66 maintains a charge to keep the transistor 76 conductive for a period of time greater than the open portion of the dial pulses. This period of time is cut short by the discharge of the capacitor 50, which renders the transistor 76 non-conductive thereby assuring that the transistor 32 is conductive immediately after the dial contacts have been subsequently closed. It is to be understood, however, that the value of these components can be selected to keep the transistor 76 conductive (and transistor 32 cut off) for slightly less than the open circuit portion of the dial pulse, but for a sufficient length of time to keep the capacitive elements in the telephone loop from receiving a charge that will cause ringer tap. In such a case, the capacitor 50 can be eliminated.

The circuit of FIG. 1 also reduces the effect of the reactive components in the circuit on the operation of the pulsing relay. As previously mentioned above, when the telephone loop is open circuited (i.e. the load across the conductors 5 and 10 is changed from a closed circuit condition to an open circuit condition) the transistor 32 is rendered non-conductive. The effect of rendering the transistor 32 non-conductive is to substantially increase resistance in series with the relay coils 26 and 27 thereby decreasing the time constant required to collapse the magnetic flux in the relay coils. Hence, when transistor 32 is non-conductive the current flow through the relay coils 26 and 27 rapidly decays to deactuate the relay 29 and thereby enables the operation of the relay to more closely follow the dial pulses.

The transformer 17 functions as a convenient means for rapidly detecting when the connected telephone loop is open circuited. However, it should be understood that other means for detecting the open loop condition can be substituted for the transformer, such as for example, an inductor or a saturable core. The relay coil could also function as a means for detecting when the telephone loop is open circuited, such as for example, as set forth in a copending application Ser. No. 860,645 and entitled "Pulsing Circuit Including A Switching And Current Regulator Circuit" filed for the inventor of the present application on Sept. 24, 1969.

In addition to the foregoing, the circuit of FIG. 1 has the advantage of exhibiting a very high input impedance to communication signals being transmitted by the conductors 5 and 10. This is particularly important since any loading effect upon a telephone line undesirably reduces the signal transmission efficiency of the system. In most systems, low impedance relays such as reed type relays, cannot be used in detection circuits in which the relay coil is connected directly across the telephone line without undesirably loading the circuit. In the circuit of FIG. 1, the primary windings 20 and 22, in addition to sensing the change in current, also function as reactive elements connected in series with the relay coils 26 and 27 to increase the input impedance of the circuit to a point that the loading effect of the relay coils is substantially negligible.

Figure 2:
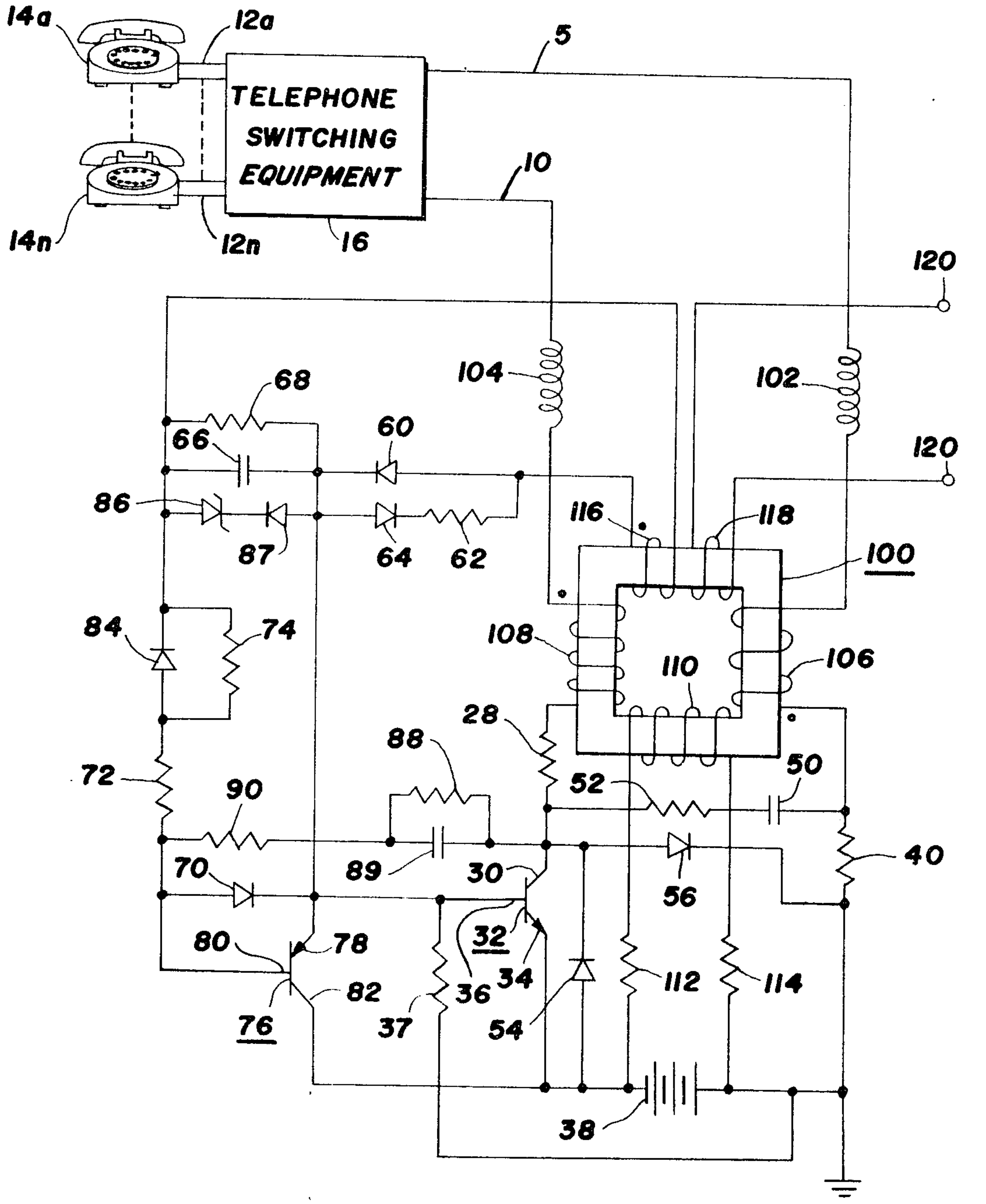
FIG. 2 is a schematic diagram of a second embodiment of a pulsing circuit of the invention including a saturable reactor control device.

In the embodiment of FIG. 2 a saturable reactor 100 and a pair of retard coils 102 and 104 are substituted for the relay 29 and the transformer 17 of the circuit of FIG. 1. The same referenced numerals have been used to designate corresponding elements in FIGS. 1 and 2 to maintain a correspondence between the respective circuit, thereby facilitating a ready understanding of the circuits.

One end of the retard coil 102 is connected to the conductor 5 while the other end is connected through a coil 106 in the saturable reactor to the current limiting resistor 40. One end of the retard coil 104 is connected to the conductor 10 while the other end is connected through a coil 108 in the saturable reactor to the current limiting resistor 28. The retard coils 102 and 104, the windings 106 and 108, the resistors 28 and 40, and the transistor 32 define a series circuit connected between the power source 38 and the conductors 5 and 10 that is energized by an "off hook" (closed circuit) condition by any one of the connected telephones **14*a*–14*n*. The retard coils 102 and 104** are used to increase the input impedance of the pulsing circuit to the signals transmitted by the telephone connection, and can be eliminated if the added amount of impedance is unnecessary.

A bias is supplied to the saturable core 100 by a coil 110 connected across the power source 38 through the current limiting resistors 112 and 114. A first output winding 116 on the saturable core is connected to the bi-directional rectifying circuit (diodes 60 and 64) to charge the capacitor 66 in a manner as set forth above with regards to the secondary winding 24 of FIG. 1. A second output winding 118 on the saturable core provides signal pulses of opposite polarity across a pair of terminals 120 whenever the telephone loop is open and close circuited. The pair of terminals 120 are adapted to be connected to a control circuit, such as a flip-flop circuit, or a relay circuit, to provide continuous pulse type signals corresponding to the dial pulses.

The circuit of FIG. 2 functions in essentially the same manner as does the circuit of FIG. 1. The transistor 32 is forward biased by the resistor 37. When a connected telephone set is "off hook" and during the closed circuit portion of the dialing pulses, current flows through the series circuit, the conductors 5 and 10, and the connected telephone set and the saturable reactor is saturated. When the connected telephone is open circuited (such as during dial pulses) a signal is developed across the output winding 116 which renders the diode 60 conductive and charges the capacitor 66 in a direction to render the transistor 76 conductive and the transistor 32 non-conductive. When the telephone set is subsequently closed circuited, a signal is developed across the output winding 116 which renders the diode 64 conductive and charges the capacitor 66 in a direction to reverse bias the transistor 76 and render the transistor 32 conductive. In effect, the transistor 32 of FIG. 2 functions as a switch in the same manner as set forth with regards to FIG. 1, to open circuit for a controlled period of time during duration of the open circuit portion of the dial pulses thereby significantly reducing the charge and discharge current flow through the connected telephone ringer. The switching response of the circuit is also increased by decreasing the time constant for collapsing the magnetic flux in the saturable reactor as set with regards to the circuit of FIG. 1.

Although the inventive concept has been described in terms of two specific circuit arrangements, it will be obvious to persons skilled in the art that minor modifications are possible and that the scope of the invention is as set forth in the Claims which follow.

What is claimed is:

1. In a telephone system including an exchange having switching means, a plurality of subscriber telephone sets, a telephone line individually connecting each telephone set to the switching means for selecting individual ones of said telephone lines, and a direct current power source, a pulsing circuit comprising:

a control device including a coil responsive to be actuated by a current flow therethrough;

a switching circuit responsive to control signals for switching between a high impedance state and a low impedance state;

circuit means connecting said switching circuit and said coil in a direct current series circuit between said switching means and said power source so that said switching means can connect said series circuit to a telephone line, wherein the series circuit, and a connected telephone line and telephone set define a telephone loop connection, and wherein said switching circuit is normally in said low impedance state to actuate said control device when a closed circuit condition is present in a connected telephone set, and control circuit means coupled to said series circuit and said switching circuit so that said control circuit means detects when said telephone loop is switched from a closed to an open circuit condition and applies a control signal to said switching circuit that momentarily switches said switching circuit to said high impedance state.

2. A telephone system as defined in claim 1 wherein said switching circuit is switched to said high impedance state by said control circuit for a period of time on the order of the duration of the open circuit portion of a telephone dialing pulse.

3. A telephone system as defined in claim 2 wherein said control device is a relay.

4. A telephone system as defined in claim 2 wherein said control device is a saturable reactor.

5. In a telephone system including an exchange having switching means, a plurality of subscriber telephone sets, a telephone line individually connecting each telephone set to said switching means for selecting individual ones of said telephone lines, and a direct current power source, a relay pulsing circuit comprising:

a relay including a coil;

a transformer including a primary winding and a secondary winding;

a transistor;

circuit means connecting the collector and emitter of said transistor, said primary winding and said relay coil in a direct current series circuit between said switching means and said power source for connecting across a telephone line;

circuit means for applying a saturating forward bias to said transistor so that said transistor energizes said relay in response to a closed circuit condition in a connected telephone set, and a control circuit coupled to said transistor and said secondary winding for momentarily removing said forward bias when a signal is developed by said secondary winding indicating that a connected telephone set was open circuited.

6. A relay pulsing circuit as defined in claim 5 wherein said control circuit includes:

a control transistor;

capacitive means coupled to the base and emitter of said control transistor;

a rectifying circuit coupled between said capacitive means and said secondary winding, responsive to a preset polarity of signals across said secondary windings for applying a charge across said capacitor for rendering said control transistor conductive, and circuit means for connecting said emitter and collector of said control transistor to said other transistor so that said other transistor is rendered non-conductive when said control transistor is conductive.

7. A relay pulsing circuit as defined in claim 6 wherein:

a second rectifying circuit is coupled between said secondary winding and said capacitive means, responsive to a signal across said secondary winding having a polarity opposite said preset polarity for charging the capacitive means in a direction opposite said other rectifying circuit;

second capacitive means, and circuit means connecting said second capacitive means to said series circuit so that said second capacitive means stores a charge when said transistor connected in the direct current series circuit is conductive and functions to provide a current flow through said primary winding in a direction so that said first mentioned capacitive means renders said control transistor non-conductive when a connected telephone set switches from an open to a closed circuit condition.

8. A relay pulsing circuit comprising:

a pair of conductors for connection to a switching circuit that connects and disconnects a direct current circuit across said pair of conductors;

a pair of power terminals for connection to a direct current power source;

a relay having a coil;

a transformer having a primary winding and a secondary winding;

first and second transistors;

circuit means connecting said primary winding, said relay coil, and the collector and emitter of said first transistor in a direct current series circuit between said power terminals and said pair of conductors;

biasing means connected to the base of said first transistor for applying a forward biasing signal thereto, said biasing signal having a sufficient magnitude so that said first transistor is saturated when said direct current circuit is connected across said pair of conductors;

circuit means connecting the emitter and collector electrodes of said second transistor to the base and emitter of said first transistor so that said first transistor is rendered non-conductive when said second transistor is conductive;

capacitive means;

a rectifying circuit coupled between said secondary winding and said capacitive means responsive to a preset polarity of signals across said secondary winding for applying a charge to said capacitive means, and circuit means connecting said capacitive means to the base and emitter electrodes of said second transistor so that when the current flow through said series circuit is interrupted a charge is developed by said capacitive means that momentarily renders said second transistor conductive.

9. A relay pulsing circuit as defined in claim 8 wherein said emitter and collector of said first transistor is connected between said relay coil and said power terminals.

10. A relay pulsing circuit as defined in claim 8 including:

a second relay coil magnetically coupled to said other relay coil;

a second primary winding magnetically coupled to said other primary winding, and circuit means for connecting said second relay coil and said second primary winding in said series circuit so that a coil and a winding are located in opposite legs of said series circuit to provide a balanced configuration, and so that said second coil and second primary winding are connected in a flux-aiding manner with said other coil and said other primary winding respectively.

11. A relay pulsing circuit as defined in claim 8 including:

a second rectifier circuit coupled between said secondary winding and said capacitive means, responsive to a signal across said secondary winding having a polarity opposite to said preset polarity, for charging said capacitive means in a direction opposite to said first mentioned rectifying means to develop a charge across said capacitive means to render said secondary transistor non-conductive;

second capacitive means, and circuit means coupling said second capacitive means to said series circuit so that said second capacitive means stores a charge when said first transistor is conductive, and discharges through said primary winding when said switching circuit is closed providing a current flow in a direction so that said first mentioned capacitive means receives a charge for rendering said second transistor non-conductive.

12. An electrical circuit comprising:

a control device having a coil;

switching means responsive to a control signal for switching between a high impedance state and a low impedance state;

a pair of power terminals for connection to a direct current power source;

a pair of input terminals for connection to a switching circuit for connecting and disconnecting a direct current circuit across said input terminals;

circuit means connecting said coil and said switching means in a direction current series circuit between said power source and said input terminals so that said switching circuit is normally in said low impedance state to energize said coil when a direct current closed circuit connection is exhibited across said pair of input terminals, and control circuit means coupled to said series circuit and to said switching means so that said control circuit means detects when a direct current circuit is disconnected from said pair of input terminals to apply a control signal to said switching means to momentarily switch said switching circuit to the high impedance state.

13. An electrical circuit as defined in claim 12 wherein said control circuit means includes:

inductive means connected in said series circuit for providing a signal when the current flow through said series circuit is interrupted, and control circuit means coupled to said inductive means and said switching means for applying said control signal to said switching means having a controlled time duration in response to the signal from said inductive means.

14. An electrical circuit as defined in claim 13 wherein said control circuit means includes:

a control transistor;

capacitive means coupled to the base and emitter of said control transistor;

a rectifying circuit coupled between said capacitive means and said inductive means for applying a charge across said capacitive means for rendering said control transistor conductive, and circuit means for connecting said control transistor to said switching means so that said switching means is switched to said high impedance state when said control transistor is conductive.

15. An electrical circuit as defined in claim 14 wherein:

said switching means is a transistor having its emitter and collector connected in said series circuit and a biasing circuit for forward biasing said transistor into saturation, and the emitter and collector of said control transistors are coupled to said biasing circuit for overcoming said forward bias to render the series transistor non-conductive when the control transistor is conductive.

16. An electrical circuit as defined in claim 12 wherein said control device is a relay.

17. An electrical circuit as defined in claim 12 wherein:

said control device is a saturable reactor, and said control circuit means is coupled to a second coil on said saturable reactor.

18. A pulsing circuit comprising:

a pair of conductors for connection to a switching circuit that connects and disconnects direct current circuits across said pair of conductors;

a pair of power terminals for connection to a direct current power source;

a saturable reactor having a pair of coils;

first and second transistors;

circuit means connecting one of said coils and the collector and emitter of said first transistor in a direct current series circuit between said power terminals and said pair of conductors;

biasing means connected to the base of said first transistor for applying a forward biasing signal thereto, said biasing signal having a sufficient magnitude so that when a direct current circuit is connected across the pair of conductors the transistor is saturated;

circuit means connecting the emitter and collector electrodes of said second transistor to the base and emitter of said first transistor so that said first transistor is rendered non-conductive when said second transistor is conductive;

capacitive means;

a rectifying circuit coupled between the other one of said coils and said capacitive means for applying a charge thereto, and circuit means connecting said capacitive means to the base and emitter electrodes of said second transistor so that when the current flow through said series circuit is interrupted a charge is developed by said capacitive means that momentarily renders said second transistor conductive.

* * * * *

UNITED STATES PATENT OFFICE
CERTIFICATE OF CORRECTION

PATENT NO. : 3,665,109
DATED : May 23, 1972
INVENTOR(S) : William E. Shaffer

It is certified that error appears in the above-identified patent and that said Letters Patent are hereby corrected as shown below:

Col 7, line 22 "on" should be ---in---.

Col. 7, line 41 "connecting" should be ---connection---

Col 9, line 12 "direction" should be ---direct---.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*